US012599879B2

(12) United States Patent
Choi

(10) Patent No.: US 12,599,879 B2
(45) Date of Patent: Apr. 14, 2026

(54) NANO CELL BLOCK MODULE FOR HOMOGENIZING A SOLUTION WITH A HIGH PRESSURE

(71) Applicant: MICRONOX INC., Seongnam-si (KR)

(72) Inventor: In Soo Choi, Seongnam-si (KR)

(73) Assignee: MICRONOX INC., Seongnam-si (KR)

( * ) Notice: Subject to any disclaimer, the term of this patent is extended or adjusted under 35 U.S.C. 154(b) by 443 days.

(21) Appl. No.: 18/335,023

(22) Filed: Jun. 14, 2023

(65) Prior Publication Data

US 2024/0416297 A1 Dec. 19, 2024

(51) Int. Cl.
*B01F 33/301* (2022.01)
*B01F 25/00* (2022.01)

(52) U.S. Cl.
CPC .... *B01F 33/301* (2022.01); *B01F 2025/9321* (2022.01)

(58) Field of Classification Search
CPC .................................................... B01F 33/301
USPC .............. 366/165.1, 165.5, 336, 340, DIG. 3
See application file for complete search history.

(56) References Cited

U.S. PATENT DOCUMENTS 4,550,681 A * 11/1985 Zimmer .................. D06B 1/08 118/409
5,534,328 A * 7/1996 Ashmead ............ B01J 19/0093 210/150
5,803,600 A * 9/1998 Schubert ................ B01F 25/23 366/144
9,656,222 B2 5/2017 Panagiotou et al.
11,660,577 B2 * 5/2023 Patel ....................... F23D 14/22 366/336
2004/0100861 A1 * 5/2004 Vanden Bussche ... B01J 19/249 366/173.1
2004/0125689 A1 * 7/2004 Ehrfeld ............... B01F 33/3012 366/165.1
2007/0007204 A1 * 1/2007 Schanz ................. B01F 35/561 422/258
2008/0078446 A1 * 4/2008 Fujiwara ............. B01F 33/3012 366/150.1
2008/0165616 A1 * 7/2008 Schubert .............. B01J 19/0093 366/145
2012/0024772 A1 * 2/2012 Enomura ............. B01J 19/0093 210/407
2014/0286122 A1 * 9/2014 Livshits ................ B01F 25/435 366/165.1
2017/0216796 A1 * 8/2017 Sameshima ............. B01F 33/30
2019/0070572 A1 * 3/2019 Mackinnon ......... B01F 25/4323
2022/0379233 A1 * 12/2022 Hirschberg .............. B01J 4/005
2023/0219090 A1 * 7/2023 Akita ................... A61K 9/1617 264/4.6

* cited by examiner

*Primary Examiner* — David L Sorkin
(74) *Attorney, Agent, or Firm* — CANTOR COLBURN LLP

(57) ABSTRACT

Provided is a nano cell block module for homogenizing a solution with a high pressure. The nano cell block module for homogenizing a solution flowing through an inner part with a high pressure includes a first nano cell block 10*a* comprising at least two flowing passages 14*a*, 14*b* extending along a horizontal direction and guiding gaps 15*a*, 15*b* guiding the solution flowing along the at least two flowing passages 14*a*, 14*b* in a vertical direction; and a second nano cell block 10*b* comprising a third flowing passage 16 guiding the solution guided along the guiding gaps 15*a*, 15*b* in a horizontal direction.

3 Claims, 5 Drawing Sheets

NANO CELL BLOCK MODULE FOR HOMOGENIZING A SOLUTION WITH A HIGH PRESSURE

BACKGROUND OF THE INVENTION

1. Field of the Invention

The present invention relates to a nano cell block module for homogenizing a solution with a high pressure, in particular, a nano cell block module to move a solution with applying a high pressure for dispersing a solute within a solvent uniformly in a nano size.

2. Description of the Related Art

A homogenizing process for dispersing a solute or a dispersoid within a solvent or a dispersive medium may be utilized in a food or beverage industry, a pharmaceutical manufacturing industry, a cosmetic industry, an ink industry or an electronic industry. A high pressure may be applied to a solution for homogenizing the solution, and the solution may be homogenized in a course of flowing along a homogenizing means to generate a shear force, an impact, a cavitation phenomenon or the like. Hereby, a solution to become a raw material of an ink or a cosmetic may be made into an emulsion where particles below 1 micrometer size are dispersed or a cell wall of a cultured microorganism may be disrupted. U.S. Pat. No. 9,656,222 disclosed a method for reducing a cavitation in an interactive chamber. It is required for homogenizing the solution that a larger sheer force, a particle collision or a cavitation or a vortex is generated. However, the prior art nor the known art discloses a homogenizing process to fulfill the required conditions adequately.

The present invention has the following purpose for solving the problem of the prior art.

Purpose of the Invention

An object of the present invention is to provide with a nano cell block module for homogenizing a solution with a high pressure capable of homogenizing a solution in a condition of a high pressure by flowing the solution in different directions within at least two blocks.

SUMMARY OF THE INVENTION

In one embodiment of the present invention, a nano cell block module for homogenizing a solution flowing through an inner part with a high pressure comprises a first nano cell block comprising at least two flowing passages extending along a horizontal direction and guiding gaps guiding the solution flowing along the at least two flowing passages in a vertical direction; and a second nano cell block comprising a third flowing passage for guiding the solution guided along the guiding gaps in a horizontal direction.

In other embodiment of the present invention, a first guiding groove connected to the guiding gaps for flowing the solution is formed at the first nano cell block.

In another embodiment of the present invention, the first and the second nano cell block have a cylindrical shape, and the guiding gaps extends obliquely with respect to the radial direction of the first or the second nano cell block.

In still another embodiment of the present invention, a width and a depth of each guiding gap become 10 to 500 μm, preferably 70 to 100 μm.

In still another embodiment of the present invention, at least a portion of surface of the first nano cell block or the second nano cell block is coated with a diamond material.

In still another embodiment of the present invention, each guiding gap has a curved shape along an extending direction, or the cross sectional size of each guiding gap increases gradually along the extending direction.

In still another embodiment of the present invention, a nano cell block module for homogenizing a solution with a high pressure comprises a first nano cell block comprising a first and a second flow guiding passage connected to an inflowing passage for flowing, a center groove connected for flowing by the first and the second flow guiding passage and guiding gaps, and a first and a second side groove connected to the center groove for flowing by the guiding gaps; a second nano cell block comprising a third and a forth flow guiding passage connected to the first and the second side groove for flowing, a staying groove formed in a shape to enclose ends of the third and the forth flow guiding passage, and a center connecting groove connected to the staying groove for flowing by guiding gaps; and a third nano cell block comprising a fifth flow guiding passage connected to the center connecting groove for flowing.

In still another embodiment of the present invention, the guiding gaps become extend linearly and have 70 to 100 μm width and depth In still another embodiment of the present invention, each guiding gap extends with one extending line of each passage tangential to the grooves, and each cross sectional size of the guiding gaps increases gradually along the extending direction.

In still another embodiment of the present invention, a cross sectional size of the fifth flow guiding passage becomes two times to that of the first flow guiding passage.

In still another embodiment of the present invention, an inner pressure of the first, the second or the second becomes 3,000 to 40,000 psi.

DETAILED DESCRIPTION OF EXEMPLARY EMBODIMENTS

Exemplary embodiments of the present invention will be described herein below with reference to the accompanying drawings.

Figure 1:
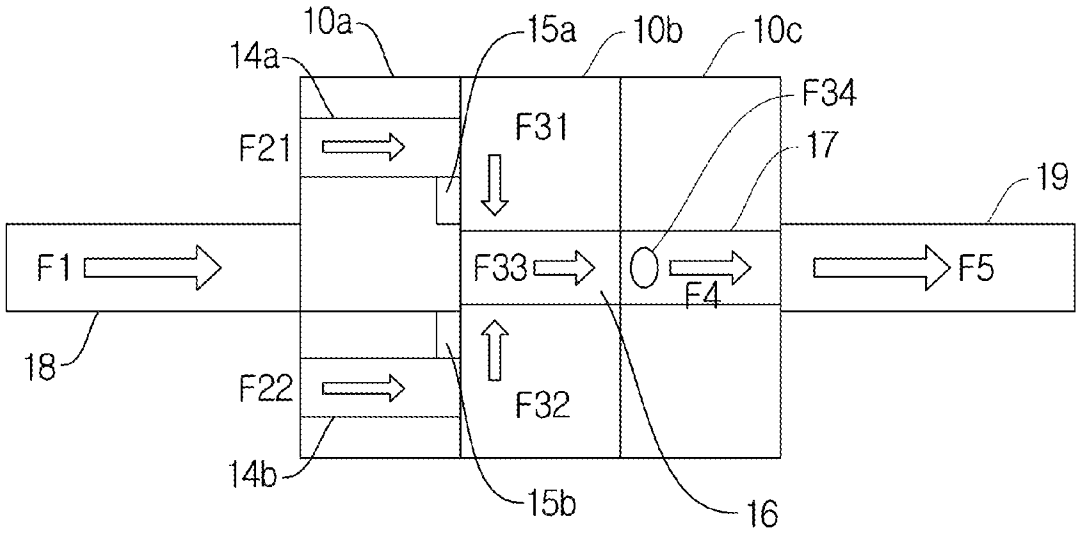
FIG. 1 shows an embodiment of a nano cell block module for homogenizing a solution with a high pressure according to the present invention.

FIG. 1 shows an embodiment of a nano cell block module for homogenizing a solution with a high pressure according to the present invention.

Referring to FIG. 1, a nano cell block module for homogenizing a solution flowing through an inner part with a high pressure comprises a first nano cell block 10*a* comprising at least two flowing passages 14*a*, 14*b* extending along a horizontal direction and guiding gaps 15*a*, 15*b* guiding the solution flowing along the at least two flowing passages 14*a*, 14*b* in a vertical direction; and a second nano cell block 10*b* comprising a third flowing passage 16 for guiding the solution guided along the guiding gaps 15*a*, 15*b* in a horizontal direction.

The solution may consist of a solvent and a solute or a dispersion medium and a dispersoid, and the solution may be input through an inputting opening to be delivered to the nano cell block module through a delivering pipe. And the solution may pass the nano cell block module under 3,000 to 40,000 psi pressure. The nano cell block module may consist of three nano cell blocks 10*a*, 10*b*, 10*c* or two nano cell blocks 10*a*, 10*b*. the solution may flow through an inflowing pipe 18 along a first direction F1 corresponding to a horizontal direction to enter the first nano cell block 10*a*. The first and the second flowing passage 14*a*, 14*bb* may be formed at the first nano cell module 10*a*, and the solution may flow along a second and a third direction corresponding to a horizontal direction. The first nano cell block 10*a* may have a cylindrical shape, and the first and the second flowing passage 14*a*, 14*b* may penetrate the first nano cell block 10*a* in a longitudinal direction. A plurality of flowing passages 14*a*, 14*b* may be formed at the first nano cell block 10*a*, not limited to. The solution introduced from one side of the first nano cell block 10*a* may flow through the first nano cell block 10*a* along the second and the third direction F21, F22. And then, the solution may flow along a fourth and a fifth direction F31, F32 corresponding to a vertical direction or directing to a center of the first nano cell block 10*a* at the other surface of the first nano cell block 10*a*. A guiding gaps 15*a*, 15*b* may be formed for the vertical direction flow of the solution, and the solution flowing along the guiding gaps 15*a*, 15*b* may flow along a third flowing passage 16 formed at the second nano cell block 10*b*. If the nano cell block module consists of two nano cell block 10*a*, 10*b*, the third flowing passage 16 may extend along a longitudinal centering line of the second nano cell block 10*b* with a cylindrical shape. And then, the solution may be discharged through a discharging pipe 19. On the contrary, if the nano cell block module consists of three nano cell blocks 10*a*, 10*b*, 10*c*, then at least a pair of the third flowing passages 16 may extend through the second nano cell block 10*b* in a longitudinal direction. The at least a pair of the third flowing passages 16 may be formed with each passage parallel to and separated by a predetermined distance from a longitudinal centering line. The solution may flow along the third passage 16 corresponding to the fifth direction F33. Then, the solution may flow along a sixth direction F34 corresponding to a vertical direction at an end part of the second nano cell block 10*b*. And then, the solution may flow along a forth flowing passage 17 formed at the third nano cell block 10*c* along a seventh direction F4 corresponding to a horizontal direction. And then, the solution may be discharged through the discharging pipe 19 along an eighth direction F5 corresponding to a horizontal direction. The nano cell block module may consist of two nano cell blocks 10*a*, 10*b* or three nano cell blocks 10*a*, 10*b*, 10*c*, and each nano cell block 10*a*, 10*b*, 10*c* may have a cylindrical shape. And each nano cell block 10*a*, 10*b*, 10*c* may have an identical or similar to each other. Each nano cell block 10*a*, 10*b*, 10*c* may be coated with a material having a large hardness, and for example, each nano cell block 10*a*, 10*b*, 10*c* may be coated with a diamond material. Specifically, an inner portion of the flowing passages 14*a*, 14*b*, 14*c*, both sides of each nano cell block 10*a*, 10*b*, 10*c* or a flowing surface of the guiding gap 15*a*, 15*b* may be coated with the diamond material. The diamond coating may be performed with a nano diamond particle, and a coating thickness may become 10 to 1,000 μm, not limited to.

Figure 2:
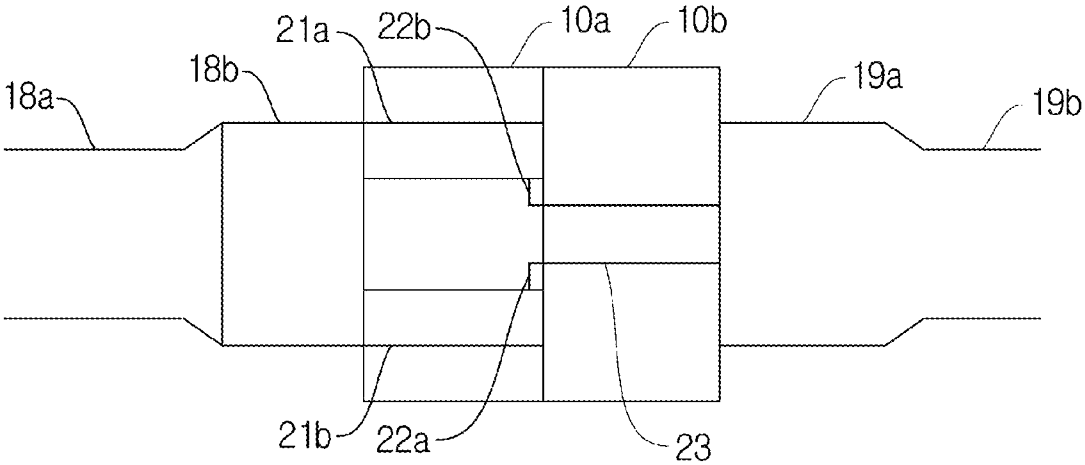
FIG. 2 shows an embodiment of a nano cell block module consisting of two blocks connected each other according to the present invention.

FIG. 2 shows an embodiment of a nano cell block module consisting of two blocks connected each other according to the present invention.

Referring to FIG. 2, the solution or the raw material may be delivered through an inflowing pipe 18*a* to an inputting pipe 18*b*, and the inputting pipe 18*b* may have a proper structure capable of flowing the solution into the first nano cell block 10*a*. A cross sectional size of the inputting pipe 18*b* may become larger than that of the inflowing pipe 18*a*. A first and a second flowing passage 21*a*, 21*b* may be formed at the first nano cell block 10*a*, and the first and the second flowing passage 21*a*, 21*b* may have a structure identical or a similar to each other. The first and the second flow passage 21*a*, 21*b* may penetrate the first nano cell block 10*a* with a cylindrical shape along a longitudinal direction. A first and a second guiding gap 22*a*, 22*b* may be formed at an end part of the first nano cell block 10*a*, and the solution flowing along the first and the second flowing passage 21*a*, 21*b* may flow along the first and the second guiding gap 22*a*, 22*b* to a centering direction. And the solution flowing along the first and the second guiding gap 22*a*, 22*b* may flow along a third flowing passage 23 formed at the second nano cell block 10*b*. The third flowing passage 23 may have a structure of extending along a center line of the second nano cell block 10*b* with a cylindrical shape. The first and the second nano cell block 10*a*, 10*b* may have a shape identical or similar to each other, and a sum of a cross sectional size of the first and the second flowing passage 21*a*, 21*b* may become identical or similar to a cross sectional size of the third flowing passage 23. The third flow passage 23 may be connected to a discharge guiding pipe 19*a*, and the discharge guiding pipe 19*a* may have an inner diameter identical or similar to that of the inputting pipe 18*b*. The solution may flow along the discharging pipe 18*b* to be delivered to a heat exchanger. And a structure of the first and the second nano cell block 10*a*, 10*b* may be explained in the following.

Figure 3:
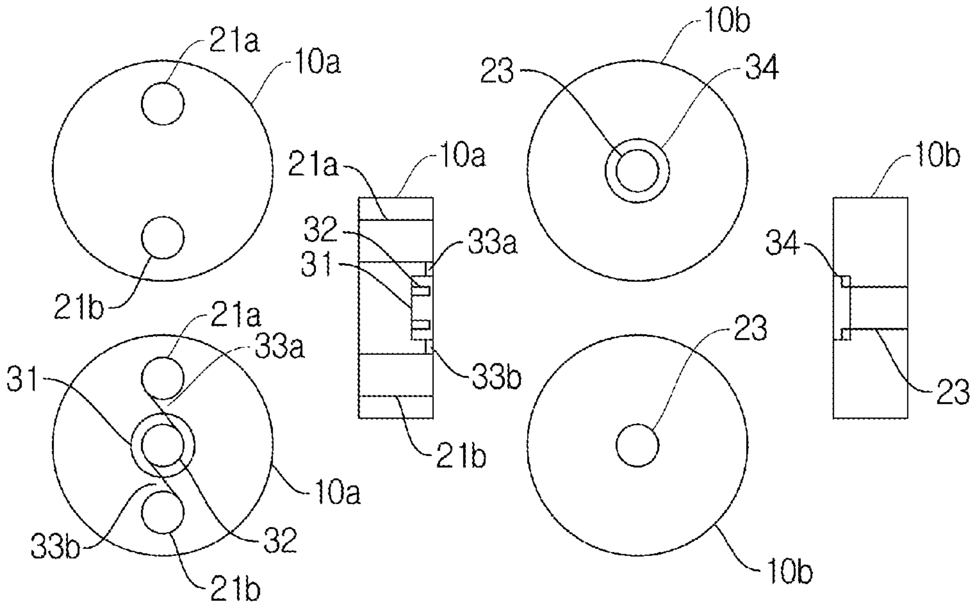
FIG. 3 shows an embodiment of each nano cell block forming the nano cell block module according to the present invention.

FIG. 3 shows an embodiment of each nano cell block forming the nano cell block module according to the present invention.

Referring to FIG. 3, various structures for guiding the flow of the solution may be formed at the first and the second surface of each nano cell block 10*a*, 10*b*. A first circular groove 31 may be formed at a center of the second surface, and selectively a second circular groove 32 may be formed at an inner part of the circular groove 32. The first and the second flowing passage 21*a*, 21*b* may be connected to the first circular groove 31 or the second groove 32 for flowing by a first and a second guiding gap 33*a*, 33*b*. The second circular groove 32 may not be formed, or the second circular groove 32 may be formed within the first circular groove 31 with the height of the second circular groove 32 lower than that of the first circular groove 31. And also, the height of the circular groove 32 may be the same as that of the first circular groove 31. And the first and the second guiding gap 33*a*, 33*b* may be connected to the first circular groove 31 or the second circular groove 32. The first and the second guiding gap 33*a*, 33*b* may extend obliquely with respect to the radial direction. And the first and the second guiding gap 33*a*, 33*b* may extend in a curved shape or a shape similar thereto. The first and second guiding gap 33*a*, 33*b* may be connected to the first and second flowing passage 21*a*, 31*b* and the first and second circular groove 31, 32, wherein the guiding gap 33*a*, 33*b* may become a tangential line of the first and second flowing passage 21*a*, 21*b* and the first and second circular groove 31, 32. And a vortex may be induced by such structure of the guiding gap 33*a*, 33*b*. And also, the cross sectional size of the guiding gap 33*a*, 33*b* may increase gradually along the extending direction, and the guiding gap 33*a*, 33*b* may extend with the cross sectional size increasing from the first and second flowing passage 21*a*, 21*b* to the first and second circular groove 31, 32. An appropriate type of a cavitation phenomenon may be induced in this way. The structure of the first nano cell block 10*a* may induce the solution collision, the cavitation phenomenon in the flowing course and the vortex, and may homogenize the solution effectively. The solution homogenized in a course of flowing along the first circular groove 31 or the second circular groove 32 may flow along a third flowing passage 23 formed in the second nano cell block 10*b*. The third flowing passage 23 may extend from a first surface to a second surface of the second nano cell block 10*b*, and a step groove 34 may be formed at an entering portion of the first surface. The first and second flowing passage 21*a*, 201*b* may have 0.5 t0 2.0 mm diameter, and the diameter of the first circular groove 31 may become 1.5 t0 2.5 times of that of the first and second flowing passage 21*a*, 21*b*. And also, the depth of the first circular groove may become 0.1 to 1.5 mm, and the diameter of the third flowing passage 23 may be identical or similar to that of the first circular groove 31 or the second circular groove 32. The depth and the width of the first and second guiding gap 33*a*, 33*b* may be 10 to 500 μm, preferably 70 to 100 μm, not limited to. The first and second guiding gap 33*a*, 33*b* may extend with the depth constant and with the width increasing gradually along the extending direction. The flowing passage 21*a*, 21*b*, 23, the circular groove 32, 32 or the guiding gap 33*a*, 33*b* may have various dimensions, not limited to.

Figure 4:
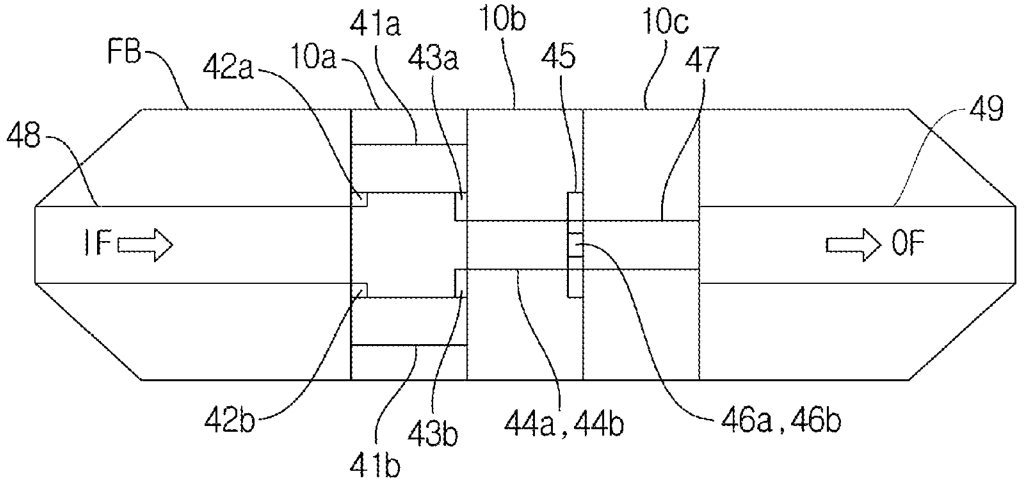
FIG. 4 shows an embodiment of a nano cell block module consisting of three nano cell blocks according to the present invention.

FIG. 4 shows an embodiment of a nano cell block module consisting of three nano cell blocks according to the present invention.

Referring to FIG. 4, a nano cell block module for homogenizing a solution with a high pressure comprises a first nano cell block 10*a* comprising a first and a second flow guiding passage 41*a*, 41*b* connected to an inflowing passage 48 for flowing, a center groove 64 connected for flowing by the first and the second flow guiding passage 41*a*, 41*b* and guiding gaps 43*a*, 43*b* and a first and a second side groove 62*a*, 62*b* connected to the center groove 64 for flowing by the guiding gaps 63*a*, 63*b*; a second nano cell block 10*b* comprising a third and a forth flow guiding passage 44*a*, 44*b* connected to the first and the second side groove 62*a*, 62*b* for flowing, a staying groove 45 formed in a shape to enclose ends of the third and the forth flow guiding passage 44*a*, 44*b* and a center connecting groove 67 connected to the staying groove 45 for flowing by guiding gaps 46*a*, 46*b*; and a third nano cell block 10*c* comprising a fifth flow guiding passage 47 connected to the center connecting groove 67 for flowing.

The nano cell block 10*a*, 10*b*, 10*c* may be secured at a receiving groove formed at a base block FB, and an entering passage 48 may be formed at the base block FB to introduce the solution to the first nano cell block 10*a* along an entering direction IF. A first and second flowing passage 41*a*, 41*b* may be formed at the first nano cell block 10*a*, and the sum of the cross sectional size of the first and second flowing passage 41*a*, 41*b* may be the same as a cross sectional size of the entering passage 48. And also, the discharging passage 49 may have a cross sectional size identical or similar to that of the entering passage 48. A first and second guiding gap 42*a*, 42*b* connecting an end of the entering passage 48 to the first and second flowing passage 41*a*, 41*b* may be formed at a first surface of the first nano cell block 10*a*. Selectively, a circular groove may be formed for guiding a flow of the solution at least one end of the first and second guiding gap 42*a*, 42*b*. The solution flowing along the first and second passage 41*a*, 41*b* may flow along a third and fourth guiding gap 43*a*, 42*b* at a second surface of the first nano cell block 10*a* to flow to an entering surface of the third and fourth flowing passage 44*a*, 44*b*, respectively. The first and second flowing passage 41*a*, 41*b* may be located on a diameter line extending in a vertical direction with the first and the second flowing passage 41*a*, 41*b* separated each other, and the third and fourth passage 44*a*, 44*b* may be located on a diameter line extending in a horizontal direction with the third and the fourth passage 44*a*, 44*b* separated each other. The solution flowing along the third and fourth flowing passage 44*a*, 44*b* may flow along a fifth and sixth guiding gap 46*a*, 46*b* connecting the third and fourth flowing passage 44*a*, 44*b* to the first circular groove 45 at the second surface of the second nano cell block 10*b* to enter a fifth flowing passage 47 formed at the third nano cell block 10*c*. The fifth flowing passage 47 may have a structure of penetrating the third nano cell block 10*c* along a centering line. And then, the solution may flow though the discharging passage 49 along a discharging direction FO to flow to a heat exchanger. Such flow process of the solution will be discussed specifically in the following.

Figure 5:
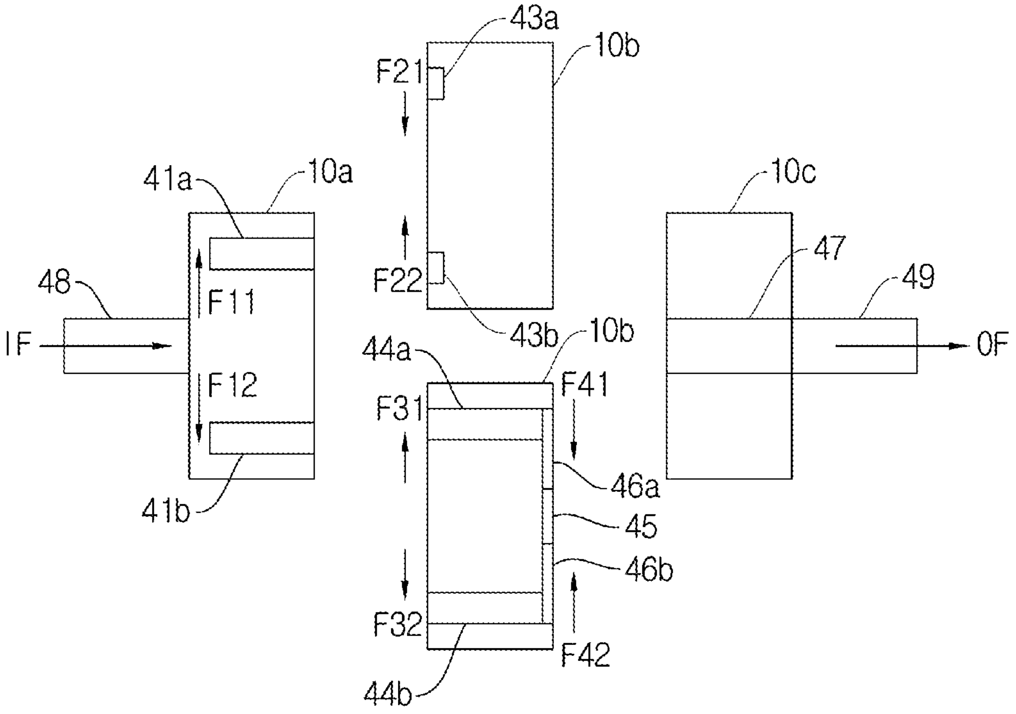
FIG. 5 shows an embodiment of a raw material or a solution flow structure in the nano cell block module consisting of three nano cell blocks.

FIG. 5 shows an embodiment of a raw material or a solution flow structure in the nano cell block module consisting of three nano cell blocks.

Referring to FIG. 5, the solution may enter the first nano cell block 10*a* along the entering passage 48, and the solution may flow along the first flow direction F11, F12 corresponding to a vertical direction. And then, the solution may move to a second and third direction F21, F22 corresponding to a vertical direction at a first surface of the nano cell block 10*a*. And the solution may flow along the first and second guiding gap 43*a*, 43*b* to a centering direction F21, F22 corresponding to a vertical direction a second surface of the first nano cell block 10*a* or a first surface of the second nano cell block 10*b*. The embodiment shown in the middle part of the FIG. 5 illustrates examples of the second nano cell block 10*b* viewed from different directions rotated by 90 degrees. The solution flowing along the centering direction may move in a direction away from the center to flow to a third and fourth flowing passage 44*a*, 44*b*. The third and fourth flowing passage 44*a*, 44*b* may be located on a diameter line extending a horizontal direction at the second nano cell block 10*b*, so that the solution may flow in a horizontal direction. And then, the solution may flow at a second surface of the second nano cell block 10*b* along a fifth and sixth direction F41, F42 to the first circular groove 45 formed at the center. The solution may flow along the third and fourth guiding gap 46*a*, 46*b*, and then the solution may pass the third nano cell block 10*c* along the fifth flowing passage 47 connected to the first circular groove 45 of the second nano cell block 10*b*. And the solution may be moved through the discharging passage 49 along a discharging direction OF to be delivered to a heat exchanger. Such flowing structure may be discussed specifically in the following.

Figure 6:
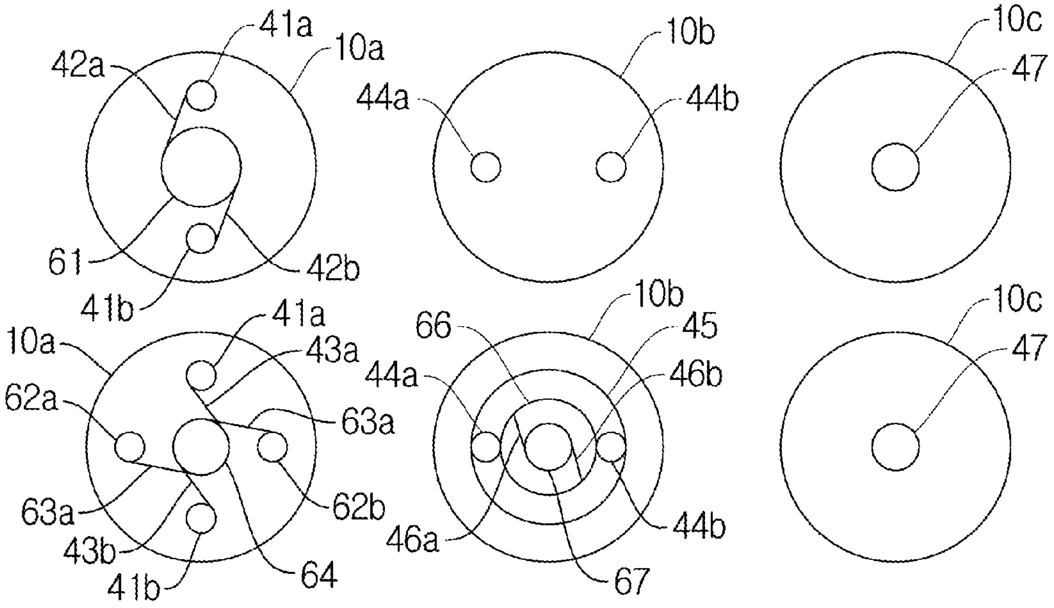
FIGS. 6 and 7 show an embodiment of each structure of each three nano cell block forming the nano cell block module.
Figure 7:
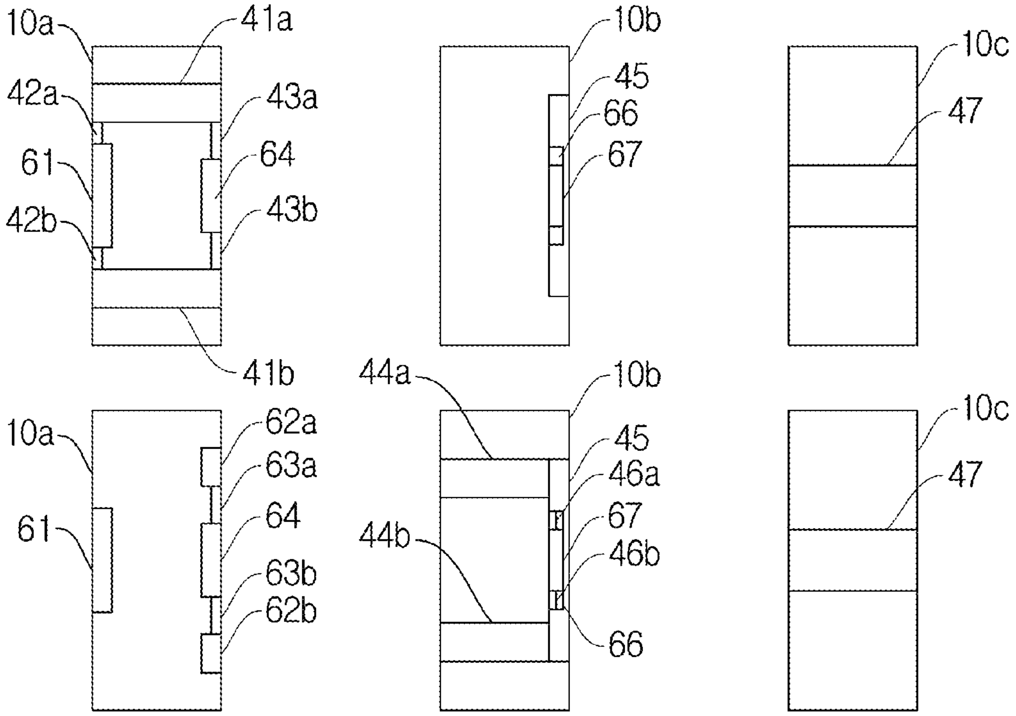

FIGS. 6 and 7 show an embodiment of each structure of each there nano cell block forming the nano cell block module.

Referring to FIGS. 6 and 7, a connecting groove 61 may be formed at the first surface of the first nano cell block 10*a* to be connected to the entering passage, and the first and second flowing passage 41*a*, 41*b* may be located on a vertical diameter line of the nano cell block 10*a*. The first and second flowing passage 41*a*, 41*b* may be formed in a way to penetrate the first nano cell block 10*a* with a cylindrical shape along a longitudinal direction. The connecting groove 61 may be connected to the first and second flowing passage 41*a*, 41*b* by the first and second guiding gap 42*a*, 42*b*. A center connecting groove 64 may be connected to the first and second flowing passage 41*a*, 41*b* by the third and fourth guiding gap 43*a*, 42*b* in order that the solution flows. A flow guiding groove 62*a*, 62*b* may be formed at the second surface of the first nano cell block 10*a*, and the center connecting groove 64 may be connected to the flow guiding groove 62*a*, 62*b* by a seventh and eighth gap 63*a*, 63*b* in order that the solution flows. The flow guiding groove 62*a*, 62*b* may be connected to the third and fourth flowing passage 44*a*, 44*b* formed a the second nano cell block 10*b*. The third and fourth flowing passage 44*a*, 44*b* may be formed in a structure that the third and fourth flowing 44*a*, 44*b* penetrates the second nano cell block 10*b* along the longitudinal direction. And also, the third and fourth flowing passage 44*a*, 44*b* may be located on a horizontal diameter line of the second nano cell block 10*b*. A staying groove 45 may be formed at the second surface of the second nano cell block 10*b*, and the staying groove 46 may become a strip shape surrounding the second surface of the second nano cell block 10*b*. A width of the staying groove 45 may be similar to the diameter of the third and fourth flowing passage 44*a*, 44*b*. An end part of the third and fourth flowing passage 44*a*, 44*b* may be located at the staying groove 45, the center connecting groove 67 may be formed based on a center of the second surface at an inner portion of the staying groove 45. A circular separating protrusion strip 66 may be formed between the staying groove 45 and the center connecting groove 67, and the solution flowing to the staying groove 45 may flow through the fifth and fourth guiding gap 46*a*, 46*b* to the center connecting groove 67. The flowing passage 47 formed at the third nano cell block 10*c* may be connected the center connecting groove. And then, the solution homogenized in a course of flowing along the fifth flowing passage 47 may be introduced to the heat exchanger.

Figure 8:
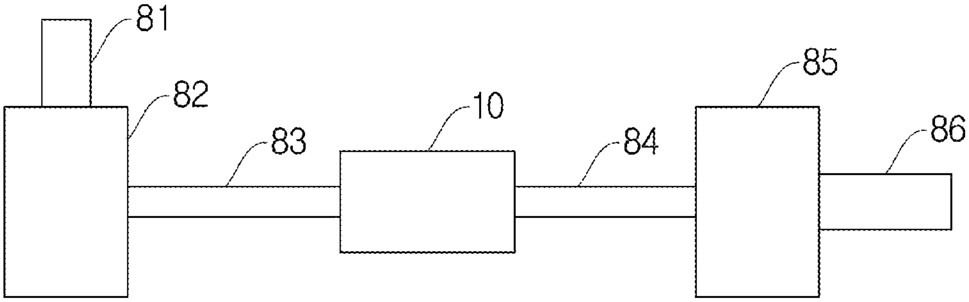
FIG. 8 shows an embodiment of a homogenizer where the nano cell block module according to the present invention is applied.

FIG. 8 shows an embodiment of a homogenizer where the nano cell block module according to the present invention is applied.

Referring to FIG. 8, a raw material to be homogenized may be input through an inputting unit 81, and the raw material may become a solution state or an emulsion that a dispersoid is dispersed into a dispersion medium. When the material is input, the raw material may be pressurized by a pressing device 82 to be delivered to a nano cell block module 10 along a delivering pipe 83. The pressing device 82 may be operated by a hydraulic means or a motor, and the raw material may be delivered in a 3,000 to 40,000 psi pressure, for example. A shear force may be applied to the raw material at the nano cell block module 10, and the dispersoid may be split in a course of colliding to a wall of the nano cell block module 10. And also, a cavitation phenomenon may be generated in a flowing passage of the raw material, and a vortex may be created to make the dispersoid in a nano size for dispersing the dispersoid into the dispersion medium uniformly. In this way, the raw material homogenized at the nano cell block module 10 may be delivered to a heat exchanger 85 along a guiding pipe 84 for stabilizing. And then, the homogenized raw material stabilized at the heat exchanger 85 may be delivered to a storing means through a storing pip 86. The raw material homogenized at the nano cell block module may be post-treated in various ways, not limited.

What is claimed is:

1. A nano cell block module for homogenizing a solution flowing through an inner part with a high pressure, the nano cell block module comprising;

a first nano cell block comprising at least two flowing passages extending along a horizontal direction and guiding gaps guiding the solution flowing along the at least two flowing passages in a vertical direction;

a second nano cell block comprising a third flowing passage for guiding the solution guided along the guiding gaps in a horizontal direction; and a first guiding groove formed at the first nano cell block and connected to the guiding gaps for flowing the solution, wherein a cross sectional size of each of the guiding gaps is configured to increase gradually along an extending direction from the at least two flowing passages to the first guiding groove.

2. The nano cell block module according to claim 1, wherein the first nano cell block and the second nano cell block have a cylindrical shape, and the guiding gaps extends obliquely with respect to a radial direction of the first nano cell block or the second nano cell block.

3. The nano cell block module according to claim 1, wherein at least a portion of a surface of the first nano cell block or the second nano cell block is coated with a diamond material.

* * * * *